United States Patent [19]

Emmons

[11] Patent Number: 5,031,994
[45] Date of Patent: Jul. 16, 1991

[54] OPTICAL SWITCH ASSEMBLY

[75] Inventor: David Emmons, Richfield, Minn.

[73] Assignee: ADC Telecommunications, Inc., Minneapolis, Minn.

[21] Appl. No.: 467,774

[22] Filed: Jan. 19, 1990

[51] Int. Cl.$^5$ ............................ G02B 6/26; G02B 6/38
[52] U.S. Cl. ............................ 350/96.20; 350/96.21; 350/96.22
[58] Field of Search ............... 350/96.15, 96.16, 96.20, 350/96.21, 96.22

[56] References Cited

U.S. PATENT DOCUMENTS

| 4,415,228 | 11/1983 | Stanley | 350/96.20 |
| 4,705,349 | 11/1987 | Reedy | 350/96.15 |
| 4,834,488 | 5/1989 | Lee | 350/96.20 |
| 4,896,935 | 1/1990 | Lee | 350/96.20 |
| 4,898,445 | 2/1990 | Newell et al. | 350/96.20 |
| 4,946,247 | 8/1990 | Muska et al. | 350/96.20 |
| 4,989,946 | 2/1991 | Williams et al. | 350/96.20 |

*Primary Examiner*—Brian Healy
*Attorney, Agent, or Firm*—Merchant, Gould, Smith, Edell, Welter & Schmidt

[57] ABSTRACT

An optical fiber switch assembly is disclosed. The assembly includes a housing which contains an optical fiber switch which is switched by rotating at least one member between first and second switch positions. An actuator is provided for rotating the member between the switch positions. The actuator includes a shaft connected to the switched member and a fixed magnet carried on the shaft. Electromagnetic elements are disposed on opposite sides of the fixed magnet. The electromagnets are energized to alternate a magnetic field and urge the fixed magnet to rotate and move the shaft in alternate rotational directions. A stop mechanism is provided to ensure accurate rotational positioning of the shaft.

22 Claims, 6 Drawing Sheets

OPTICAL SWITCH ASSEMBLY

BACKGROUND OF THE INVENTION

1. Field of the Invention

This invention pertains to optical fiber switches for switching optical transmission paths. More particularly, this invention pertains to an assembly containing such a switch.

2. Description of the Prior Art

This invention pertains to optical switches such as those which are the subject matter of copending and commonly assigned to U.S. patent application Ser. No. 300,205, filed Jan. 19, 1989, now abandoned, (a continuation-in-part of U.S. patent application Ser. No. 191,014, filed May 6, 1989), now abandoned. That application teaches an optical switch. The switch is intended for use in switching optical fibers that carry signal transmissions. The switch of the aforesaid patent application includes first and second pluralities of optical fibers bundled in first and second arrays. The two arrays are disposed facing one another and rotatable about a common axis of rotation. By rotating one fiber array relative to the other fiber array, fibers of the opposing arrays may be selectively coupled or decoupled to provide switching.

For the signal transmission industry, it is desirable to provide an optical switch that may be automatically or remotely switched between at least two positions. Such switches must be reliable, low-cost and designed to occupy a small volume. Also, the switches must be dependable for use in a wide variety of applications and environments.

In the design and manufacture of optical switches such as that shown in the aforesaid applications, it is important that the design mechanism includes means for accurately fixing the switch members in their relative rotatable positions. If the switch members are not accurately positioned when switched, there will be misalignment of the fibers of the opposing arrays. The misalignment will result in signal loss. Automatic actuators for affecting rotational switching will have to account for the need to have accurate alignment of the opposing fiber arrays when switched. It is an object of the present invention to provide an optical switch with means for actuating the switch.

SUMMARY OF THE INVENTION

According to a preferred embodiment of the present invention, an optical switch assembly is disclosed comprising an optical switch including at least one rotary member disposed for rotation about an axis. An actuator is provided for rotating the member. The actuator includes an armature mounted for rotary motion. The armature is connected to the rotating switch member. Electromagnetic drive means are provided to selectively rotate the armature in any one of two directions. A stop mechanism is provided to stop movement of the armature at any one of two positions.

DESCRIPTION OF THE PREFERRED EMBODIMENT

A. General Construction of the Switch

Referring now to the several drawing figures in which identical elements are numbered identically throughout, a description of a preferred embodiment of the present invention will now be presented with reference to an optical switch 10. Optical switch 10 is preferably such as that shown and described in the aforementioned commonly assigned and copending U.S. patent application.

It will be appreciated that the description of the present invention with reference to an optical switch such as that shown in the aforementioned U.S. patent application is done for the purpose of illustrating a preferred embodiment of the present invention. It is not intended to limit the present invention to the specific optical switch structure shown. Indeed, it is intended that the present invention could be utilized in a wide variety of optical fibers having rotary switching action.

Switch 10 includes a first switch body 12 and a second switch body 14. Each of switch bodies 12 and 14 is identical, and is provided in the form of a ceramic plug of generally cylindrical configuration. Extending axially through the bodies 12 and 14 are bores 16 and 18, respectively.

Figure 1:
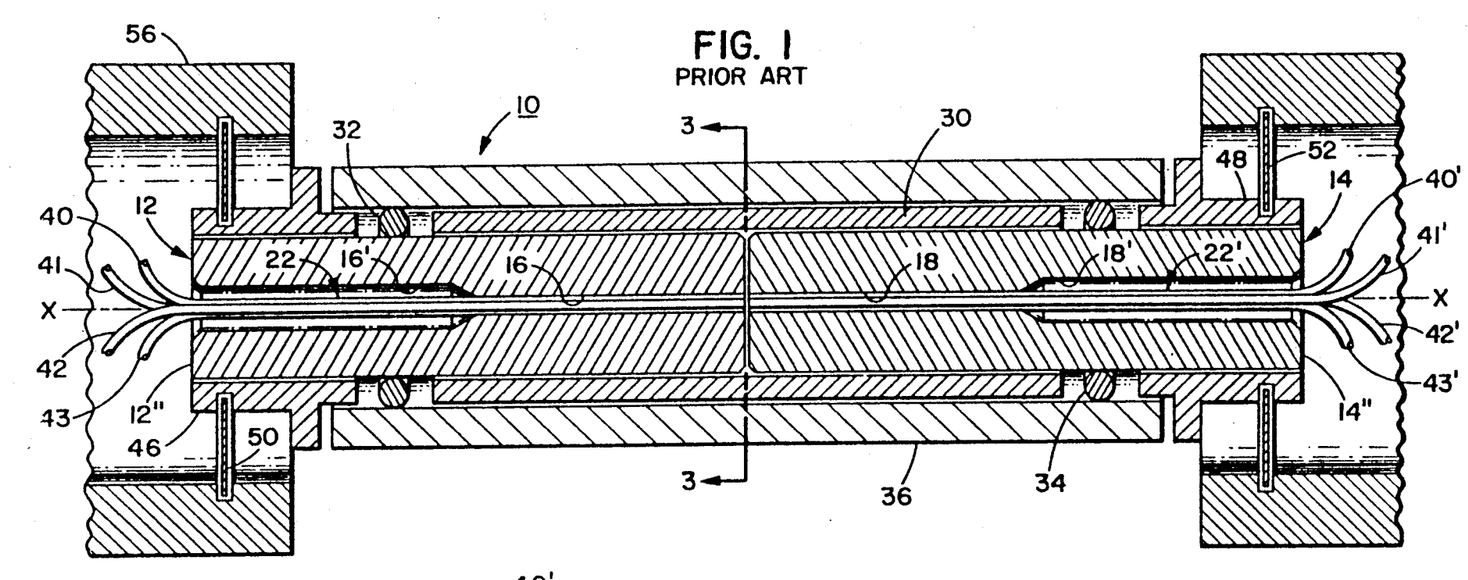
FIG. 1 is a cross-sectional side view of an optical switch including switch elements for use in the present invention.

As shown in FIG. 1, bores 16 and 18 include enlarged portions 16', 18'. The smaller diameters of bores 16 and 18 are sized to receive, in close tolerance, arrays of optical fibers. Bore portions 16' and 18' are enlarged to facilitate admission of optical fibers into bores 16, 18.

Each of switch bodies 12, 14 is provided with first and second arrays 22, 22', respectively, of optical fibers. In the embodiment shown, each of the first and second arrays 22, 22' includes four optical fibers. However, as noted in the aforesaid U.S patent application Ser. No. 300,205, the number of optical fibers in an array may vary from a minimum of one fiber to any number of a plurality of fibers within an array.

Figure 2:
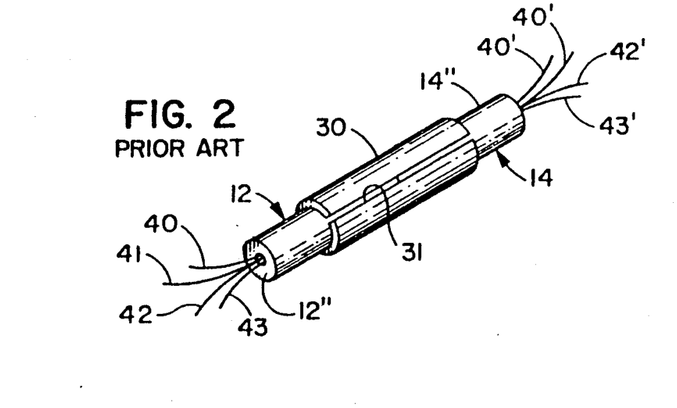
FIG. 2 is a perspective view of the switch of FIG. 1 showing switch bodies held by a split sleeve coupler.
Figure 3:
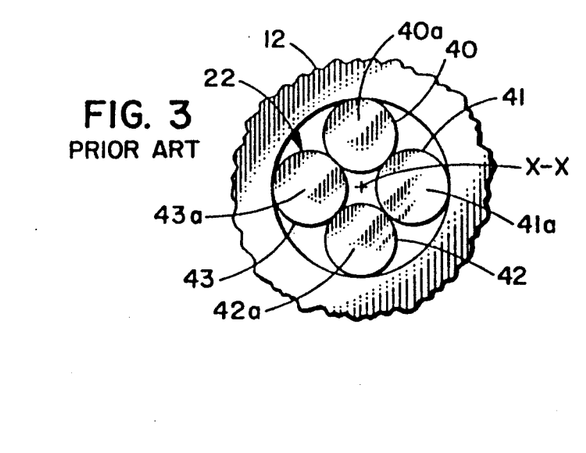
FIG. 3 is an end side view of a switch body holding an array of optical fibers taken along line 3—3 of FIG. 1.

With references to FIGS. 1-3, the reader will note the first array 22 consists of four optical fibers 40, 41, 42, and 43. First array 22 is received within bore 16 of first switch body 12. A similar second array 22' of four optical fibers 40'-43' is shown within bore 18' of second switch body 14.

Each of arrays 22 and 22' are selected such that optical fibers 40-43 and 40'-43' are disposed closelypacked in side-by-side abutting relation. Shown best in FIG. 3, the first array 22 (which is identical to second array 22') is disposed with the optical fibers 40-43 disposed circumferentially about rotational axis X—X.

The fibers 40-43 terminate at terminal ends 40a, 41a, 42a and 43a. Similarly, fibers 40'-43' terminate at terminal ends (not shown). The arrays 22, 22' within switch bodies 12 and 14, respectively, are maintained in coaxial alignment by means of a sleeve coupler 30. Shown in FIGS. 1 and 2, sleeve 30 surrounds the exterior surface of both switch bodies 12 and 14. Ends 12", 14" of switch bodies 12, 14 extend axially away from sleeve 30. Sleeve 30 is preferably a ceramic split sleeve having an axiallyextending gap 31 (see FIG. 2) disposed along the length of the sleeve 30.

With the switch bodies 12 and 14 disposed within sleeve 30, and with faces 12' and 14' opposing one another, the arrays 22, 22' are in coaxial alignment. Further, each of sleeves 12 and 14 is rotatable within sleeve 30 and axially slidable within sleeve 30.

In the embodiment shown in the aforesaid U.S. patent application Ser. No. 300,205, a first O-ring 32 is provided surrounding switch body 12. O-ring 32 opposes sleeve 30. Similarly, a second O-ring 34 is provided surrounding second switch body 14 and opposing sleeve 30.

A tube 36, preferably glass or ceramic material, is provided surrounding sleeve 30 and O-rings 32 and 34. Tube 36 is generally coaxial with sleeve 30 and coaxial with switch bodies 12 and 14. As indicated in the aforesaid U.S. patent application Ser. No. 300,205, O-rings 32 and 34 are selected to provide a liquid-tight seal between sleeve bodies 12 and 14, respectively, and tube 36, while accommodating relative axial and rotational movement of switch bodies 12 and 14.

A first packing gland 46 is provided surrounding free end 12", and a second packing gland 48 is provided surrounding free end 14". Packing glands 46 and 48 are bonded to switch bodies 12 and 14 through any suitable means. Packing glands 46, 48 are connected to first and second mounts 56, 60 by means of flexible diaphragms 50 and 52. Mount 56 may be physically connected to first and second mounts 56, 60 by means of flexible diaphragms 50 and 52. Mount 56 may be physically connected to any stationary object, or may be connected to a handle. Mount 60 may be similarly connected. As a result, by rotating one mount (for example, mount 56) relative to the other mount (for example, mount 60), the switch bodies 12 and 14 (and hence, arrays 22, 22') are rotated relative to one another about axis X—X. This relative rotation results in switching of the optical fibers by selectively optically coupling and decoupling opposing fibers of the opposing arrays 22, 22'.

The diaphragms 50, 52 accommodate relative non-rotational movement between mounts 56, 60 and switch bodies 12, 14. As a result, strict coaxial alignment between switch bodes 12, 14 is maintained. It will be appreciated that any device for permitting movement in non-rotational directions may be substituted for any one or both of diaphragms 50, 52. For example, a bellows may be satisfactorily substituted.

The foregoing description of switch 10 was done for the purpose of illustrating the switch for use with the present invention. Certain of the elements described above are not included in the presently disclosed assembly. For example, the assembly, as will be more fully described, only incorporates switch bodies 12, 14, split sleeve 30 and the optical fibers (i.e. the structure shown in FIG. 2). As will be more fully described, in the present invention, the non-rotational restricting element (which performs the functions of diaphragms 50, 52) is a bellows.

In addition to the replacement of diaphragms 50, 52 with a single bellows, the present invention utilizes a switch without O-rings 32, 34, glass tube 36 or an index matching fluid. Instead, the present design, in a preferred embodiment, will utilize arrays 22, 22' where one array (for example, array 22) has a concave end surface, and the opposing array (for example, array 22') has a convex end surface. The detail of this structure is not shown in the present drawings and is not necessary to the practice of the present invention. The structure is shown and described in commonly assigned and co-pending U.S. patent applications Ser. Nos. 07/467,748 and 07/467,803, filed concurrently herewith and respectively entitled "Optical Switch with Reduced Reflection" and "Method for Constructing Optical Switch".

B. Description of the Novel Assembly

1. Generally

Figure 4:
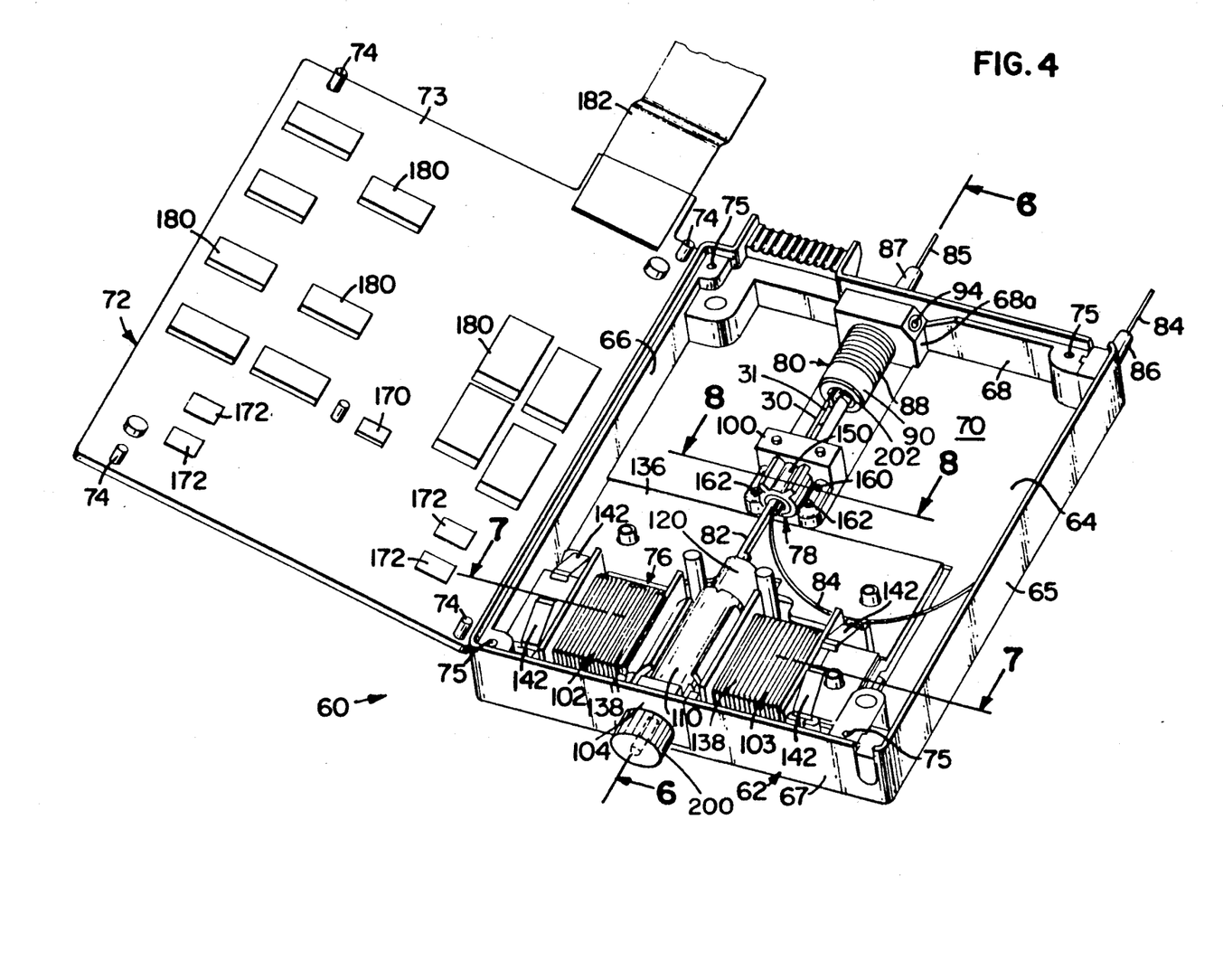
FIG. 4 is a perspective view of an optical switch assembly according to the present invention with a printed circuit board cover removed to show the interior of the assembly.
Figure 5:
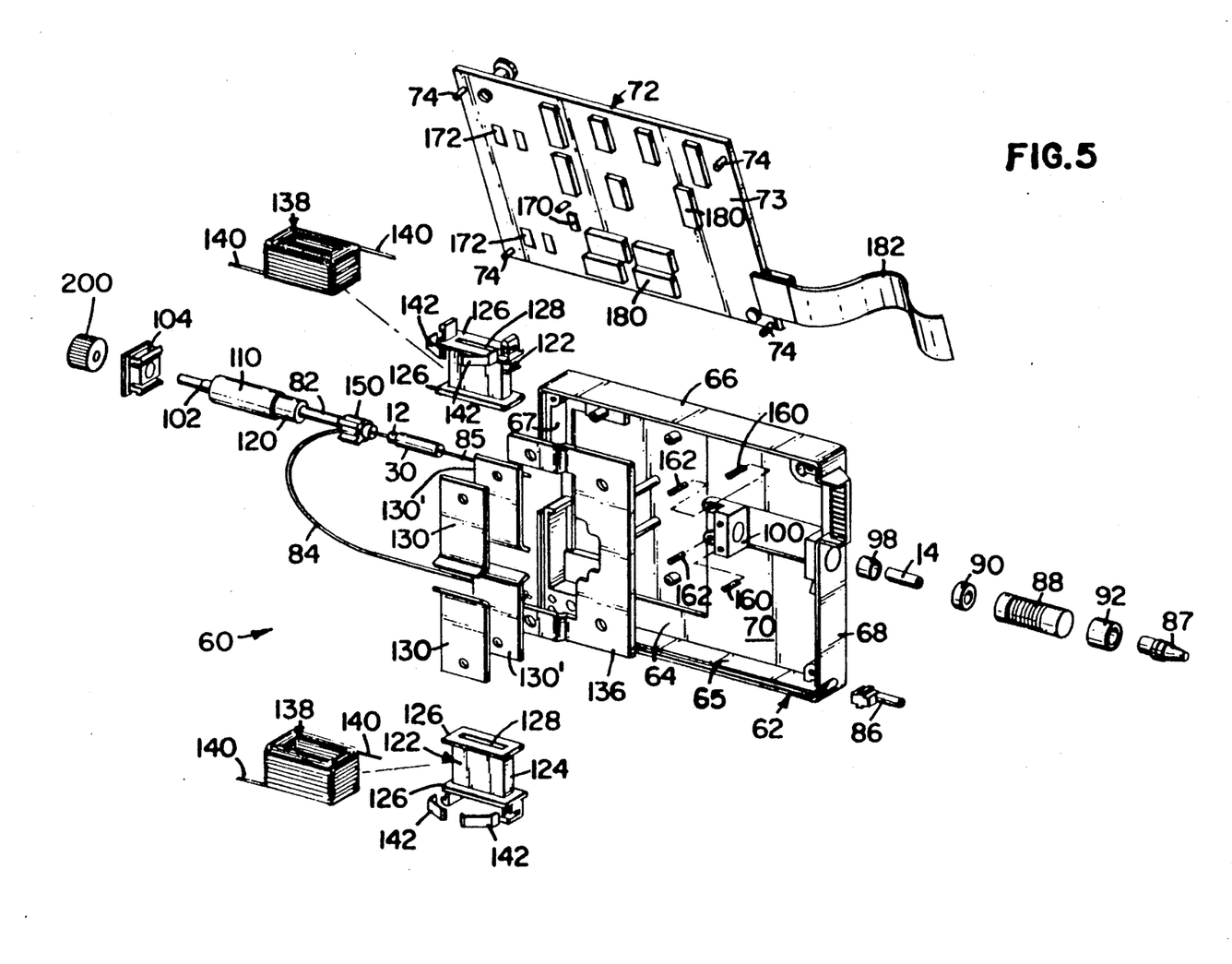
FIG. 5 is an exploded perspective view of the assembly of FIG. 4.

Reference is now directed to FIGS. 4 and 5 wherein assembly 60 is shown according to the present invention. The assembly 60 includes a housing 62 having a flat bottom plate 64, side walls 65 and 66 and opposing end walls 67, 68. The bottom plate 64, side walls 65, 66 and end walls 67, 68 cooperate to define a housing interior 70.

A printed circuit board cover 72 is provided to be secured to end walls 67, 68 and side walls 65, 66 to cover interior 70. In FIG. 4, the cover 72 is shown removed to expose interior 70 with the underside 73 of the cover 72 being shown. To properly align the cover 72 on the housing 62, posts 74 (see FIG. 4) are formed projecting from interior surface 73 and positioned to align with and be received within holes 75 formed in the material of the side walls 65, 66 and end walls 67, 68.

The housing interior 70 contains an actuator mechanism 76, a stop mechanism 78 and a switch subassembly 80 (see FIG. 4). The actuator mechanism 76, stop mechanism 78 and switch subassembly 80 are connected by a common shaft 82.

2. Switch Subassembly

Figure 6:
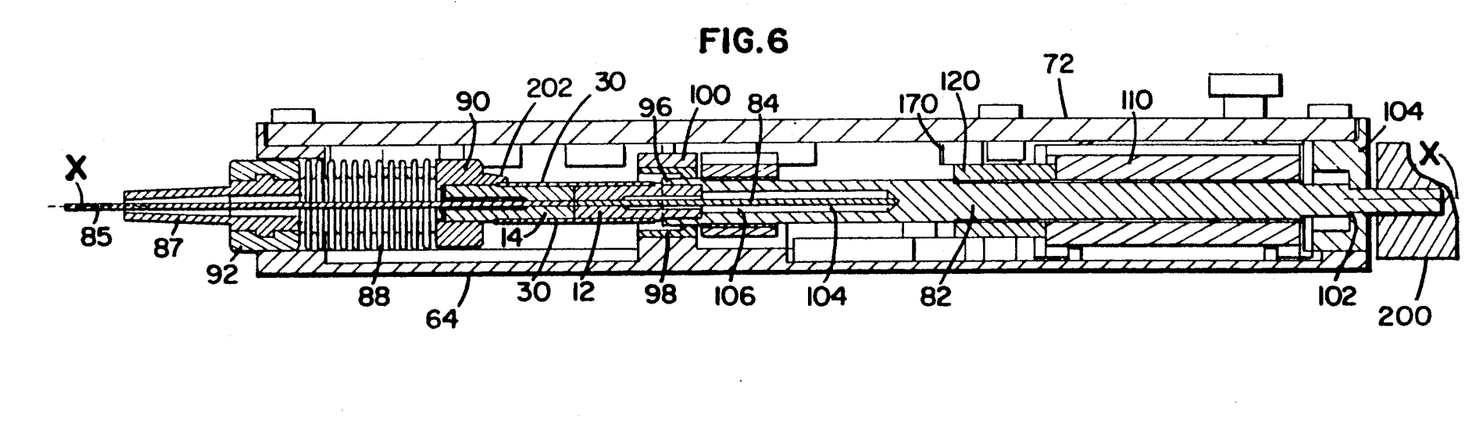
FIG. 6 is a view taken along line 6—6 of FIG. 4 with the cover shown in place on the assembly.

With best reference to FIGS. 4, 5 and 6, the switch subassembly 80 includes switch bodies 12 and 14 connected by a split sleeve connector 30. Individual fibers are not shown in FIGS. 5 or 6. Instead, the fibers are shown bundled in an incoming fiber cable 84 and an outgoing fiber cable 85. Cable 84 is passed into the interior 70 of housing 62 through a strain relief boot 86. Similarly, cable 85 is passed through end wall 68 through a strain relief boot 87.

The switch subassembly 80 includes a bellows 88 for permitting movement for the elements of the switch assembly 80 in directions other than about axis X—X. A first collar 90 (see FIGS. 5 and 6) is provided for connecting the bellows 88 to switch body 14. A key 202 projects from collar 90 and is received within slot 31 of split sleeve 30. Key 202 prevents rotation of sleeve 30.

A second collar 92 is provided for connecting bellows 88 to end wall 68. The second collar 92 is received within a hub portion 68a (see FIG. 4) of end wall 68. Collar 92 is retained in place by a set screw 94 to prevent rotational and axial movement of the bellows 88.

Figure 6A:
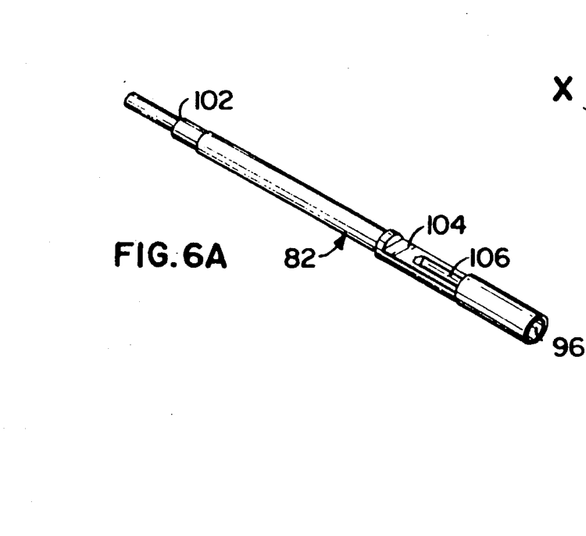
FIG. 6A is a perspective view of a shaft for use in the present invention.

Shown best in FIGS. 6 and 6A, shaft 82 terminates at a cupped end portion 96 which is sized to snugly receive switch body 12. Cupped portion 96 is journaled in a bearing 98 which is carried in a bearing housing portion 100 of housing 62.

With the structure thus described, as shaft 82 rotates about its longitudinal axis X—X, switch body 12 will rotate about axis X—X. While switch body 12 is rotating about axis X—X, switch body 14 does not rotate and is prevented from rotation by bellows 88. As a result of the relative rotation between switch bodies 12 and 14, the fibers carried in fiber cables 84, 85 may be switched.

The present assembly 60 is directed to a two-position switch. Mainly, switch bodies 12 and 14 are preferably intended to be in one of two normal positions. With four fibers per array (as shown in FIGS. 1-3), different fiber pairs are optically coupled as the switch bodies 12, 14 are rotated 90° relative to one another.

As shown best in FIGS. 4 and 6, shaft 82 extends through end wall 67. The shaft 82 has a stepped end 102 which cooperates with a plastic insertable clip 104 such that step 102 opposed clip 104 as shown in FIG. 6. Accordingly, the cooperation of the step 102 and clip 104 is to provide a thrust bearing which counteracts the compression forces of the bellows 88.

A knob 200 is provided on shaft 82 exterior of the housing 62. As will be described, knob 200 permits optionally manual activation of the switch.

Between ends 96 and 102, shaft 82 has a cutaway portion 104 (shown best in FIG. 6A). A bore 106 extends axially through shaft 82 from cutaway portion 104 through cupped end 96. Incoming fiber cable 84 is inserted within bore 106 at cutaway portion 104 and passed to switch body 12.

3. The Actuator Mechanism

To move the switch body 12 between its two optically coupled positions, the actuator mechanism 76 is provided. The actuator mechanism 76 includes an armature magnet 110 carried on shaft 82 and disposed between diametrically opposed electromagnets 102, 103 (see FIGS. 4 and 7).

Armature magnet 110 is cylindrical, and has an axial bore into which shaft 82 is inserted. The armature 110 rotates with the shaft 82. The armature magnet 110 is any suitable fixed magnet.

Figure 10:
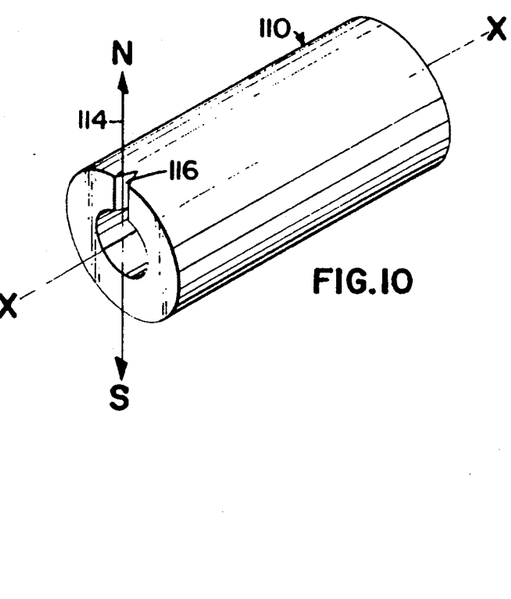
FIG. 10 is a perspective view of an armature magnet for use with the present invention showing the location of the magnetic poles of the armature magnet.

As shown in FIG. 10, the armature magnet 110 has north and south poles (N and S, respectively) diametrically opposed along a magnetic axis 114 which is perpendicular to the rotational axis X—X. A detent 116 is formed on an axial face of armature magnet 110 to ensure proper alignment with a sensor magnet 120 as will be more fully described.

To rotate the armature magnet 110, electromagnets 102, 103 are provided. Electromagnets 102, 103 are of similar design and construction. Accordingly, similar elements of electromagnets 102, 103 are numbered identically and a description of one will suffice as a description of the other.

The magnets 102, 103 include bobbins 122 of dielectric material including a main body 124 and spaced apart side walls 126. A bore 128 is formed completely through main body 124.

The electromagnets 102, 103 further include top and bottom pole pieces 130, 130' having flat bodies 132, 132' and arcuate ends 134, 134'. Two opposing pole pieces 130, 130' are joined together with their bodies 132, 132' extending through the bore 128 of bobbin 122. The arcuate ends 134, 134' are shaped to partially surround armature magnet 110. As shown best in FIGS. 7 and 7A, the pole pieces 130, 130' are selected for the electromagnets 102, 103 to be symmetrical about the vertical axis Z—Z and the transverse axis Y—Y. The body portions 132, 132' extend generally parallel and in alignment with axis Y—Y (which is perpendicular to axis Z—Z and axis X—X). A stator 136 connects the pole pieces 130, 130' of both electromagnets 102, 103 to complete a magnetic circuit between the electromagnets 102, 103.

Conductor windings 138 are provided surrounding each of bobbins 122. The windings 138 are contained between the bobbin side walls 126, 127. The windings 138 terminate at leads 140 (see FIG. 5).

Electrically conductive spring contacts 142 are provided carried by the bobbins 122. Each spring contact 142 is connected to a lead 140. As will be described, electrical signals to energize the coils 132 are passed from circuit board cover 72 to the spring contacts 142.

4. Stop Mechanism

The stop mechanism 78 includes a collar 150 connected to the shaft 82 for rotation therewith. Two radially projecting stop plates 152, 153 (see FIGS. 8, 8A, 8B) project from collar 150 with their longitudinal axis aligned with axis X—X. The plates 152, 153 are spaced 90 degrees apart.

On opposite sides of the collar 150, the housing bottom plate 64 includes raised areas having front and back set screw pairs 160 and 162 threadably received through the bottom plate 64. Screw pairs 160 and 162 are disposed on opposite sides of the collar 150 and oppose plates 152, 153. Preferably, set screws 160 are adjusted during manufacture to limit the maximum rotation of shaft 82. Set screws 160 may then be permanently set so they cannot be further adjusted. The set screws 160 are set for optimum optical alignment of switched fibers. Set screws 162 may be field adjusted to further limit the rotational range of the shaft 82. This adjustment permits a user to intentionally misalign the fibers in order to variably attenuate a signal carried by the fibers. The range of adjustment is within the fixed range of motion permitted by set screws 160.

Figure 8:
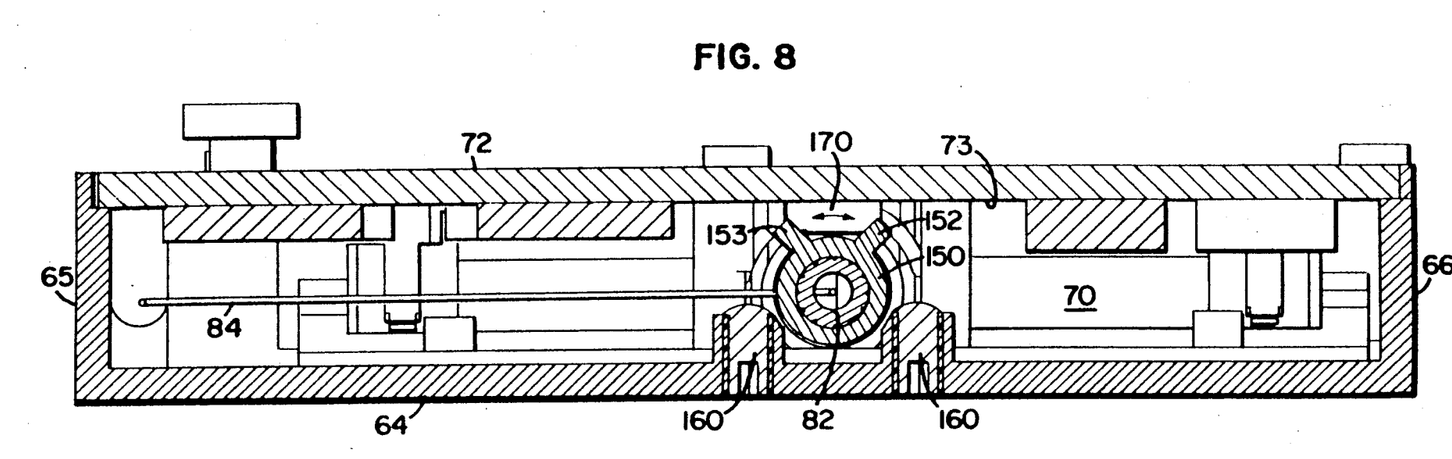
FIG. 8 is a view taken along line 8—8 of FIG. 4 showing the cover in place on the assembly.
Figure 8A:
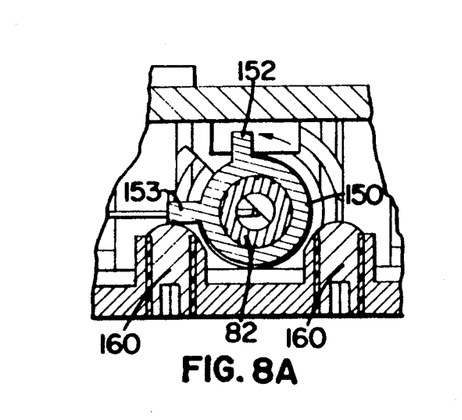
FIG. 8A and FIG. 8B are views similar to a portion of the view of FIG. 8 showing alternative rotational positions of rotatable elements of the assembly.
Figure 8B:
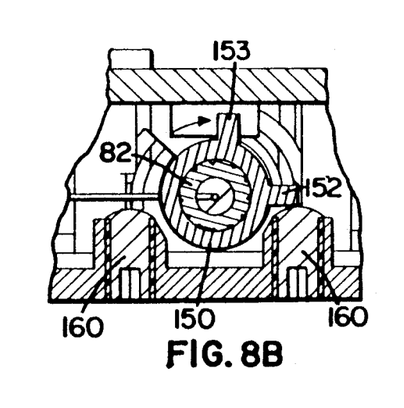

With best reference to FIGS. 8, 8A and 8B, the reader will note that the collar 150 has a maximum rotation of 90°. With the plates 152, 153 set 90° apart, this results in the set screws 160, 162 being 180° apart. As a result, set screws 160, 162 can be placed in a common wall 64. Accordingly, to activate, a user accesses set screws 162 from the same side.

Figure 7:
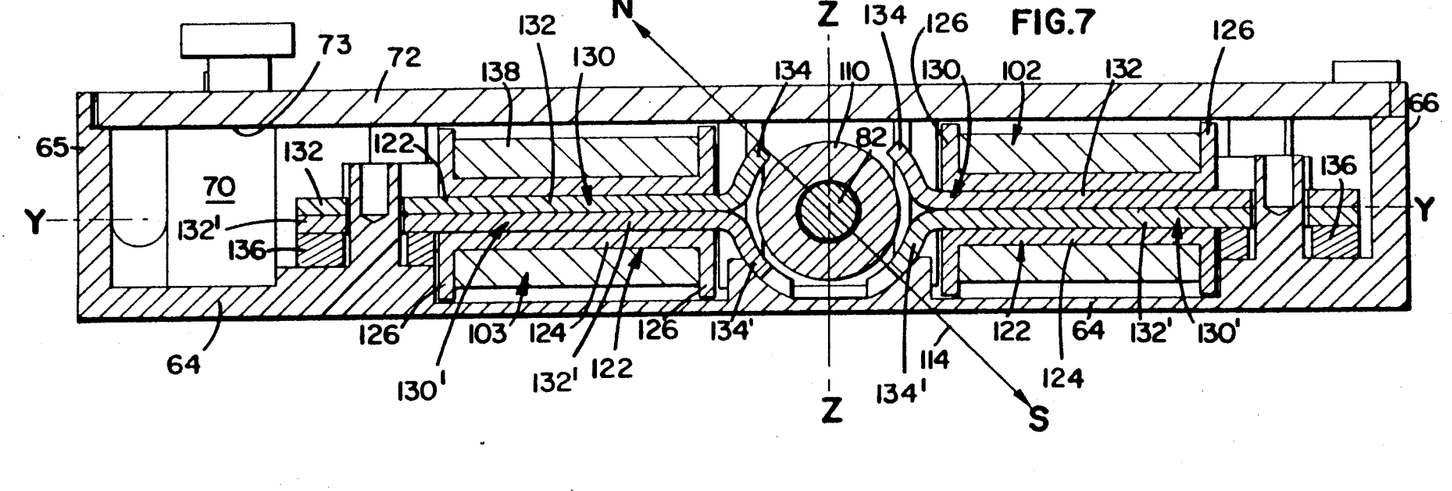
FIG. 7 is a view taken along line 7—7 of FIG. 4 with the cover shown in place on the assembly.

The collar 150 is fixed onto shaft 82 in a predetermined alignment with the magnetic axis 114 of armature magnet 110. Preferably, as will be described, armature magnet 110 and collar 150 are mutually aligned for the magnetic axis 114 to be rotated 45 degrees to the left of the axis Z—Z (as shown in FIG. 7) when plate 153 is abutting the set screws 160 (as shown in FIG. 8A).

Figures 7A, 11:
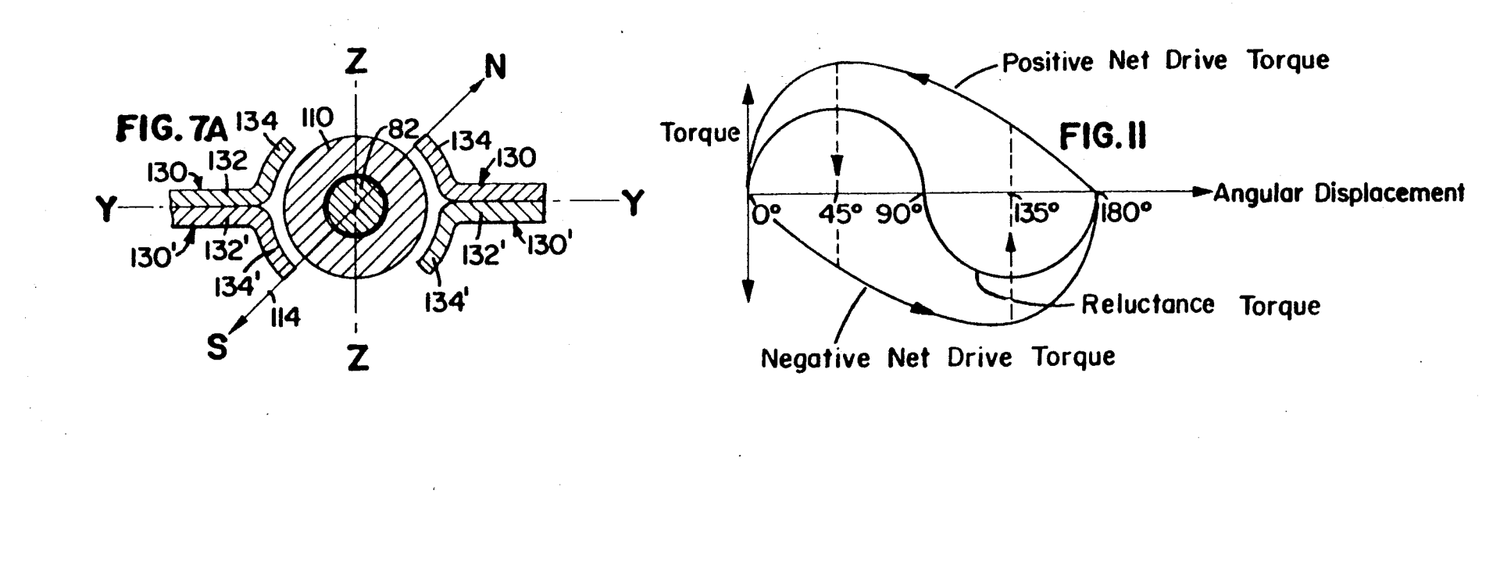
FIG. 7A is a view similar to a portion of the view of FIG. 7 showing an alternative rotational position of a rotatable element of the assembly.
FIG. 11 is a graph showing a reluctance and drive torques on the shaft of the assembly as a function of the angular displacement of the shaft.

Similarly, the positioning of the plates 152, 153 is selected for plate 152 to be abutting the set screws 160 (as shown in FIG. 8B) when the magnetic axis 114 is rotated 45 degrees to the right of the Z—Z axis as shown in FIG. 7A.

5. Rotational Position Indicator

It is desirable to be able to determine the positioning of the switch. Accordingly, a sensor magnet 120 is provided.

Figure 9:
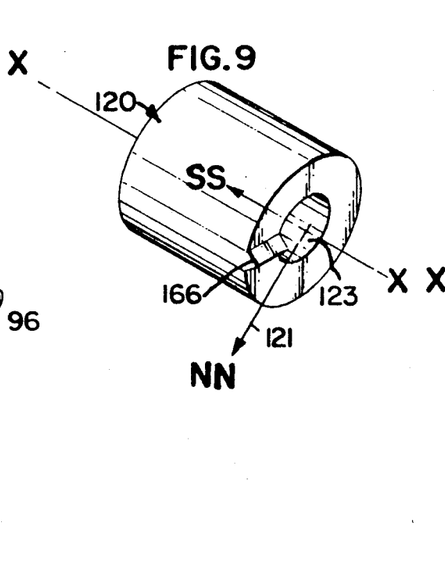
FIG. 9 is a perspective view of a sensor magnet for use with the present invention showing the location of the magnetic poles on the sensor magnet.

As shown in FIG. 9, the sensor magnet 120 has a magnetic axis 121 which is preselected for a north pole NN of the magnet 120 to be at 90 degrees to a south pole SS of the magnet 120. The sensor magnet 120 is cylindrical and has a bore 123 sized to be snugly received onto shaft 82 for rotation therewith. An axial face of the magnet 120 has a keying projection 166 selected to be received within the detent 116 of magnet 110.

The projection 166 and detent 116 permit accurate alignment of the magnets 110, 120. With this alignment, the magnetic axis 114 of armature magnet 110 bisects the 90 degree magnetic axis 121 of sensor magnet 120. As a result, when the stop 78 is in the position shown in FIG. 8A, the north pole NN of sensor magnet 120 is facing upwardly in the direction of axis Z—Z. Similarly, when stop mechanism 78 is in the position of FIG. 8B, the south pole SS of sensor magnet 120 is facing upwardly in the direction of axis Z—Z. For the purposes of this application, reference to "up" will mean in the direction of the cover 72 and "down" will mean in the opposite direction.

6. Circuitry

The printed circuit board 72 is provided with means for detecting the positioning of the sensor magnet 120 and for energizing the coils of the electromagnets 102, 103 (see FIG. 4). A Hall effect mechanism 170 (e.g. any commercially available Hall effect sensor, transistor, switch or latch) is carried on surface 73 and positioned on the circuit board 72 to oppose the sensor magnet 120 when the board 72 is properly aligned on the housing 62. Conductive pads 172 are provided on surface 173 and disposed to oppose and abut, in electrical connection, the spring contacts 142 when the printed circuit board 72 is properly aligned on the housing 62. Circuit elements 180 are provided on the printed circuit board 72 to receive inputs from a conductor ribbon 182.

The circuitry carried on printed circuit board 72 is selected to provide a pulse to pads 172 to selectively energize both of electromagnets 102, 103 and, at the user's option, to alternate the direction of the field between the electromagnets 102, 103. The circuitry also includes means for receiving the input from the Hall effect element 170 to indicate the positioning of the sensor magnet 120. It will be appreciated that electrical circuitry to perform these functions forms no part of this invention per se and the design of such circuitry is within the skill of the art.

7. Magnetic Latching

With the structure of the assembly 60 as described, the reader will note that, with best reference to FIG. 7, the armature magnet 110 is naturally urged for its magnetic axis 114 to align with the transverse axis Y—Y. This results from the combination of the magnet 110 with the electromagnets 102, 103 (regardless of whether they are energized) and stator 136. To the extent the magnetic axis 114 is not aligned with axis Y—Y, a reluctance torque is experienced on the armature magnet 110 and transmitted to the shaft 82. The structure which results in the reluctance torque constitutes a biasing means for urging the armature 110 to rotate with its axis 114 aligned with axis Y—Y.

As shown in FIG. 11, the magnitude of the reluctance torque is zero when the axis 114 is rotated 90 degrees from the vertical axis Z—Z to the left (when viewed in FIG. 7)—the zero degree position in FIG. 11. Also, the reluctance torque is zero when the magnetic axis 114 is rotated 90 degrees to the right (when viewed in FIG. 7A) of the vertical axis Z—Z—the 180 degree position in FIG. 11. Finally, the reluctance torque is zero when the magnetic axis 114 is collinear with the vertical axis Z—Z—the 90 degree position in FIG. 11. In an ideal design with an ideal fixed magnet 110, the absolute value of the reluctance torque experienced by the armature magnet 110 is a maximum when the armature axis 114 is 45 degrees to either the left or the right of the vertical axis Z—Z (the 45 degree and 135 degree positions in FIG. 11) which correspond with FIGS. 7 and 7A.

As will become apparent, for operation and practice of the invention, the ideal design and construction is not necessary. All that is necessary is that the reluctance torque on the magnet 110 is other than zero when the armature in angularly displaced from a stopped position and with the reluctance torque urging the armature to the stopped position.

From the foregoing description, the reader will note that when the windings 138 are not energized, the poles N, S of armature magnet 110 are urged to point to the metallic pole members 130, 130'. However, the armature is restricted from movement to this position by the stop mechanism 78. The alignment of the stop mechanism 78 is selected such that in the desired stopped positions (FIGS. 8A and 8B), the armature 110 is experiencing a non-zero reluctance torque in the magnetic system to urge it to remain in the stopped position. This results in a magnetic latching of the switch to retain it in either of the desired switch positions which are 90 degrees apart.

8. Electromagnetic Driving

When it is desired to switch from one switch position (FIG. 8A) to the other switch position (FIG. 8B), the coils 138 are energized with polarities selected to generate a drive torque of magnitude sufficient to overcome the reluctance torque and drive the armature 110 to rotate to the position of FIG. 7A. As a result, by selecting the polarity of the magnets 102, 103 and pulsing a signal to the magnets 102, 103, the armature 110 and shaft 82 can be selectively pivoted back and forth between positions shown in FIG. 7 and FIG. 7A. In each of those positions, the system is magnetically latched with the reluctance torque of the magnetic system urging the stop member 78 into a switched position. Also, in each of the switch positions, either the north pole NN of the sensor magnet 120 or the south pole SS of the sensor magnet 120 is directly opposing the Hall effect element 170 so that the specific switch position can be sensed.

In FIG. 11, the drive torque is generated by the electromagnets 102, 103 are shown. From inspection of FIG. 11, the reader will note that when switching from one switch position (e.g. the 135° position) to the other switch position (e.g. the 45° position), the drive torque overcomes the latching force of the reluctance torque. This drives the armature to the other position (e.g. the 45° position). As the other position is approached, both the drive and reluctance torque cooperate to urge the armature to the stop position. At the stop position, the drive torque is zero due to the de-energization of electromagnetics 102, 103 and the reluctance torque maintains the armature latched against the stop position. To move back to the original stop position (e.g. the 135° position), the procedure is repeated with a change in polarity of the electromagnets 102, 103.

9. Manual Drive

In addition to electromagnet drive, the switch can be manually driven. Without energization of the electromagnets 102, 103, a user simply engages knob 200. With a force sufficient to overcome the reluctance torque, the user turns the knob 200 between the two switch positions. At the switched positions, the reluctance torque maintains the armature 110 in the switched position when the operate releases the knob 200.

From the foregoing detailed description of the present invention, it has been shown that the object of the invention has been attained in a preferred manner. Modifications and equivalents of the disclosed concept such as readily occur to those skilled in the art are intended to be included within the scope of this inventions. Thus, the scope of the invention is intended to be limited only by the scope of the claims as are, or may hereafter be, appended hereto.

What is claimed is:

1. An optical fiber switch assembly comprising:
   an optical fiber switch having at least one rotating member which rotates between at least a first and second rotated position with said switch causing switching between optical fibers as said member is rotated between said first and second positions;
   actuator means for rotating said member through a path of travel between said first and second positions, said actuator means including an armature mounted for rotation, aid actuator means also including connecting means for connecting said armature to said member for said member to rotate as said armature rotates, said actuator means also including electromagnetic drive means for selectively urging said armature to rotate, said actuator means further including biasing means for imparting an urging force for urging said armature to align in a predetermined alignment with said biasing means imparting an urging force on armature substantially throughout said path of travel; and
   stop means for stopping rotation of said armature for said armature to stop at positions corresponding with said first and second positions.

2. An assembly according to claim 1 wherein said actuator means and said stop means cooperate to define a magnetic latching switch.

3. An assembly according to claim 1 wherein said armature has magnetic poles.

4. An assembly according to claim 3 wherein said biasing means urges said magnetic poles to align in a predetermined alignment; and
   said stop means is selected to prevent rotation of said armature to said predetermined alignment.

5. An assembly according to claim 1 comprising sensing means for sensing a rotated position of said armature.

6. An optical fiber switch assembly comprising:
   an optical fiber switch having at least one rotating member which rotates between at least a first and second rotated position with said switch causing switching between optical fibers as said member is rotated between said first and second positions;
   actuator means for rotating said member between said first and second positions, said actuator means including an armature mounted for rotation, said actuator means also including connecting means for connecting said armature to said member for said member to rotate as said armature rotates, said actuator means also including electromagnetic drive means for selectively urging said armature to rotate;
   stop means for stopping rotation of said armature for said armature to stop at positions corresponding with said first and second positions; and
   a housing sized to house said switch, said actuator means and said stop means, said actuator means having exposed electrical contacts for receiving a current to energize said electromagnetic drive means, a cover for said housing including contact means on said housing disposed to engage said exposed contacts in electrical connection when said cover is disposed on said housing in a predetermined position.

7. An optical fiber switch assembly for optical fibers, said assembly comprising:
   an optical fiber switch having at least one rotating member which rotates between at least a first and second rotated position with said switch causing switching between optical fibers as said member is rotated between said first and second positions;
   actuator means for rotating said member between said first and second positions, said actuator means including an armature mounted for rotation about an axis of rotation, connecting means for connecting said armature to said member for said member to rotate as said armature rotates, said actuator having a predetermined magnetic axis generally perpendicular to said axis of rotation;
   said actuator means further including electromagnetic drive and biasing means for selectively urging said armature to rotate about said axis of rotation when said drive means is engaged, and urging said magnetic axis to a predetermined alignment at least when said drive means is not energized, said electromagnet drive means including magnet pole members disposed on diametrically opposed sides of said actuator in co-alignment with said predetermined alignment, said biasing means including a magnetic circuit defined by cooperation of said magnetic pole members, said armature and a stator connecting said magnetic pole members;
   stop means for stopping rotation of said armature at positions corresponding with said first and second positions, said stop means selected for said armature to be displaced from said predetermined alignment and against an urging of said biasing means at said first and second positions.

8. An assembly according to claim 7 wherein said stop means is a physical barrier preventing rotation of said armature beyond a predetermined range of rotation.

9. An optical fiber switch assembly for optical fibers, said assembly comprising:
   an optical fiber switch having at least one rotating member which rotates between at least a first and second rotated position with said switch causing switching between optical fibers as said member is rotated between said first and second positions;
   actuator means for rotating said member between said first and second positions, said actuator means including an armature mounted for rotation about an axis of rotation, connecting means for connecting said armature to said member for said member to rotate as said armature rotates, said armature having a predetermined magnetic axis generally perpendicular to said axis of rotation;

said actuator means further including electromagnetic drive and biasing means for selectively urging said armature to rotate about said axis of rotation when said drive means is engaged, and urging said magnetic axis to a predetermined alignment at least when said drive means is not energized;

stop means for stopping rotation of said armature at positions corresponding with said first and second positions; said stop means selected for said armature to be displaced from said predetermined alignment and against an urging of said biasing means at said first and second positions; and said biasing means selected to impart a reluctance torque on said armature to rotate said armature about said axis of rotation with a magnitude of said reluctance torque varying in response to an angular displacement of said magnetic axis from said predetermined alignment.

10. An assembly according to claim 9 wherein said stop means is selected for said magnetic axis to be in misalignment with said predetermined alignment by an amount for said reluctance torque to have an absolute value greater than zero.

11. An assembly according to claim 10 wherein said stop means is selected for said magnetic axis to be in misalignment with said predetermined alignment by an amount selected to maximize said absolute value.

12. An assembly according to claim 11 wherein said misalignment is selected to be about 45 degrees.

13. An optical fiber switch assembly for optical fibers, said assembly comprising:

an optical fiber switch having at least one rotating member which rotates between at least a first and second rotated position with said switch causing switching between said optical fibers as said member is rotated between said first and second positions;

actuator means for rotating said member between said first and second positions, said actuator means including an armature mounted for rotation about an axis of rotation, connecting means for connecting said armature to said member for said member to rotate as said armature rotates, said armature having a predetermined magnetic axis generally perpendicular to said axis of rotation;

said actuator means further including electromagnetic drive and biasing means for selectively urging said armature to rotate about said axis of rotation when said drive means is engaged, and urging said magnetic axis to a predetermined alignment at least when said drive means is not energized;

stop means for stopping rotation of said armature at positions corresponding with said first and second positions, said stop means selected for said armature to be displaced from said predetermined alignment and against an urging of said biasing means at said first and second positions;

said electromagnet drive means including magnet pole members disposed on diametrically opposed sides of said actuator in co-alignment with said predetermined alignment;

coil means surrounding said pole means; and a housing sized to receive said switch means, said actuator means and said stop means, a cover sized to cover said housing, exposed electrical contacts on said cover disposed to engage said coil means to provide a signal path for selectively energizing said coil means.

14. An optical fiber switch assembly for optical fibers, said assembly comprising:

an optical fiber switch having at least one rotating member which rotates between at least a first and second rotated position with said switch causing switching between optical fibers as said member is rotated between said first and second positions;

actuator means for rotating said member between said first and second positions, said actuator means including an armature mounted for rotation about an axis of rotation, connecting means for connecting said armature to said member for said member to rotate as said armature rotates, said armature having a predetermined magnetic axis generally perpendicular to said axis of rotation;

said actuator means further including electromagnetic drive and biasing means for selectively urging said armature to rotate about said axis of rotation when said drive means is engaged, and urging said magnetic axis to a predetermined alignment at least when said drive means is not energized;

stop means for stopping rotation of said armature at positions corresponding with said first and second positions, said stop means selected for said armature to be displaced from said predetermined alignment and against an urging of said biasing means at said first and second positions; and a sensing magnet connected to said armature for rotation therewith, said sensing magnet having predetermined magnetic poles spaced apart to oppose a predetermined location when said armature is at said first and second positions.

15. An assembly according to claim 14 comprising an electrical circuit element disposed in said predetermined location and selected to detect a magnetic pole of said sensing magnet.

16. An assembly according to claim 15 wherein said stop means includes an abutting member secured to said armature for rotation therewith, said sensing magnet having predetermined magnetic north and south poles disposed to oppose said predetermined location when said armature is in a position corresponding with either of said first and second positions, respectively; and a magnetic field sensing element disposed in said location to detect a presence of either of said poles of said sensing magnet.

17. An optical fiber switch assembly comprising:

an optical fiber switch having at least one rotating member which rotates between at least a first and second rotated position with said switch causing switching between optical fibers as said member is rotated between said first and second positions;

actuator means for rotating said member between said first and second positions, said actuator means including an armature mounted for rotation, said actuator means also including connecting means for connecting said armature to said member for said member to rotate as said armature rotates, said actuator means also including electromagnetic drive means for selectively urging said armature to rotate;

stop means for stopping rotation of said armature for said armature to stop at positions corresponding with said first and second positions; and attenuator means for attenuating a signal carrier through said switch.

18. An assembly according to claim 17 wherein said attenuator means includes means for selectively varying said stop positions.

19. An assembly according to claim 1 wherein said stop means is selected to prevent rotation of said armature to said predetermined alignment.

20. An assembly according to claim 1 wherein said biasing means includes magnetic pole members connected by a stator and aligned with a magnetic pole of said armature to cooperate with said armature to define a magnetic circuit.

21. An assembly according to claim 20 wherein said pole members include surfaces spaced from said armature a substantially constant distance throughout said path of travel.

22. An assembly according to claim 20 wherein said pole members include coil means; said drive means including said pole members and coil means.

* * * * *

UNITED STATES PATENT AND TRADEMARK OFFICE
CERTIFICATE OF CORRECTION

PATENT NO. : 5,031,994
DATED : July 16, 1991
INVENTOR(S) : David Emmons

It is certified that error appears in the above-identified patent and that said Letters Patent is hereby corrected as shown below:

Column 9, line 36, "aid" should read --said;

Column 10, claim 7, line 27, insert --said-- after the word "between"; and     Column 10, claim 7, line 34, "actuator" should read --armature--.

Signed and Sealed this

Eighth Day of June, 1993

*Attest:*

MICHAEL K. KIRK

*Attesting Officer*      *Acting Commissioner of Patents and Trademarks*